3,005,025
PREPARATION OF NEUTRAL CHLORTETRACYCLINE

Jerry Robert Daniel McCormick, New City, and Neva-Tay Kathleen Smith, Monsey, N.Y., assignors to American Cyanamid Company, New York, N.Y., a corporation of Maine
No Drawing. Filed Aug. 7, 1959, Ser. No. 832,149
3 Claims. (Cl. 260—559)

This invention relates to the preparation of neutral chlortetracycline and more particularly is concerned with an improved process of converting chlortetracycline hydrochloride to neutral chlortetracycline in an essentially aqueous medium.

In the United States patent to Winterbottom et al. No. 2,671,806 there is disclosed a process of purifying chlortetracycline which involves dissolving crude chlortetracycline in a hydroxylated organic solvent by the use of a nitrogenous base, i.e. triethylamine, which serves to neutralize and solubilize the chlortetracycline. The undissolved impurities are removed by filtration and by readjusting the pH of the filtrate with hydrochloric acid purified chlortetracycline hydrochloride is precipitated. It is also suggested in this patent to convert chlortetracycline hydrochloride to neutral chlortetracycline by dissolving crude chlortetracycline hydrochloride in a lower alkanol or a lower alkoxy lower alkanol by the addition of a suitable amine, filtering off the insoluble impurities and adding water to the solution to precipitate the purified product.

However, this method while it produces a high quality therapeutically useful product is not without certain disadvantages, notably in that it involves the use of hydroxylated organic solvents and organic bases which keep the cost of these purification procedures high. Furthermore, the yield and potency of the resulting product, that is chlortetracycline neutral, are not as high as are desired.

In accordance with the present invention we have discovered a simple process for converting chlortetracycline hydrochloride to neutral chlortetracycline that is practical, cheap and efficient to carry out. Surprisingly, we have discovered that a high quality, high potency chlortetracycline neutral product can be produced economically by an easy to handle, solid-to-solid conversion technique which utilizes an essentially aqueous suspension of chlortetracycline hydrochloride as the starting material. Then by means of a relatively simple pH manipulation there is produced an essentially aqueous suspension of chlortetracycline which after filtration and washing yields the desired high potency product.

In accordance with the present invention chlortetracycline hydrochloride is dissolved in a medium composed essentially of water and Cellosolve (ethylene glycol monoethyl ether). For optimum results we prefer to use four volumes of water to one volume of Cellosolve but we may use from 55–98% water to 45–2% Cellosolve. Other lower alkoxy lower alkanols, in addition to 2-ethoxyethanol and 2-methoxyethanol may, of course, be used. The mixture of chlortetracycline hydrochloride, Cellosolve and water containing the required amount of sodium carbonate to adjust the pH of the solution to between 3.5 and 7.0 is stirred, preferably at room temperature, until the conversion to neutral chlortetracycline is complete and which may take place in a relatively few minutes under optimum conditions. The crystalline neutral chlortetracycline is thereafter filtered, washed with water and dried in vacuo in the usual manner.

The invention will be described in greater detail in conjunction with the following specific examples.

Example 1

A medium was used composed of 80% water, 20% Cellosolve (ethylene glycol monoethyl ether) and sodium carbonate. 350 grams of twice-recrystallized chlortetracycline hydrochloride was slurried by mechanical stirring with 350 milliliters of Cellosolve and 1175 milliliters of water. One equivalent (36.6 grams) of sodium carbonate was dissolved in 175 milliliters of water and added to the slurry during stirring. An additional 50 milliliters of water was used to rinse the flask to insure complete transfer of the sodium carbonate. The pH of the slurry was 5.72, which corresponds roughly to the isoelectric point of chlortetracycline (pH=5.5±0.2) (the total amount of Cellosolve present was 20% of the solvent volume). Complete solution was not obtained. The slurry was stirred for 4 hours before filtering. The chlortetracycline neutral was washed with 300 milliliters of water and dried in vacuo at 40° C. for 6 hours. Five runs under these conditions were made with the following results:

|  | Chlortetracycline Hydrochloride | Chlortetracycline Neutral | |
|---|---|---|---|
|  |  | Avg. | Range |
| Potency ($\gamma$/mg.) | 975 | 1,025 | 995–1,035 |
| Product Wt. (gms.) | 350 | 318 | 315–319 |
| Yield (percent) |  | 95.5 | 95–96 |

Example 2

The procedure of the preceding example was repeated using 10 grams of chlortetracycline hydrochloride, 40 milliliters of water, 5 milliliters of Cellosolve and 1.06 grams sodium carbonate. The potency of the resulting chlortetracycline neutral was 1035 grammas per milligram and the yield was 97%.

For comparative purposes a similar experiment was carried out using the organic solvent system disclosed in the aforesaid Winterbottom et al. patent but without a filtration step and using a solvent system composed of 70 milliliters of methanol, 10 milliliters of water and 2.3 milliliters of triethylamine. A 94.6% recovery of chlortetracycline was obtained and the resulting material assayed 995 gammas per milligram.

We claim:

1. In the process of converting chlortetracycline hydrochloride to chlortetracycline neutral the improvement which comprises slurrying chlortetracycline hydrochloride in a solvent system of the group consisting of 2-methoxyethanol and 2-ethoxyethanol and water containing alkali metal carbonate so as to adjust the pH of the solution to between 3.5 and 7.0 whereupon purified crystalline chlortetracycline neutral is obtained.

2. The process according to claim 1 in which the lower alkoxy lower alkanol is 2-ethoxyethanol.

3. The process according to claim 1 in which the alkali is sodium carbonate.

References Cited in the file of this patent
UNITED STATES PATENTS
2,671,806    Winterbottom et al. _____ Mar. 9, 1954